US010331637B2

(12) United States Patent
Han et al.

(10) Patent No.: US 10,331,637 B2
(45) Date of Patent: Jun. 25, 2019

(54) APPARATUS AND METHOD FOR TRANSMITTING AND RECEIVING FILES IN GENERAL PURPOSE DEVICE

(71) Applicant: Samsung Electronics Co., Ltd., Gyeonggi-do (KR)

(72) Inventors: Se-Hee Han, Seoul (KR); Jun-Hyung Kim, Gyeonggi-do (KR); Jong-Hyo Lee, Gyeonggi-do (KR); Joo-Yeol Lee, Gyeonggi-do (KR); Ji-Hye Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 246 days.

(21) Appl. No.: 13/910,735

(22) Filed: Jun. 5, 2013

(65) Prior Publication Data
US 2013/0325910 A1 Dec. 5, 2013

(30) Foreign Application Priority Data

Jun. 5, 2012 (KR) .................. 10-2012-0060643
May 31, 2013 (KR) .................. 10-2013-0062611

(51) Int. Cl.
G06F 16/11 (2019.01)
G06F 16/22 (2019.01)

(52) U.S. Cl.
CPC .............. G06F 16/22 (2019.01); G06F 16/11 (2019.01)

(58) Field of Classification Search
CPC .............. G06F 17/30067; G06F 3/0605; G06F 3/0683; G06F 3/0601; G06F 17/30607; G06F 16/11; G06F 16/13; G06F 16/14; G06F 16/27; G06F 16/38; G06F 16/48

USPC ........................................................ 707/812
See application file for complete search history.

(56) References Cited

U.S. PATENT DOCUMENTS

| 5,537,592 | A | 7/1996 | King et al. |
| 6,282,563 | B1* | 8/2001 | Yamamoto et al. .......... 709/202 |
| 7,478,101 | B1 | 1/2009 | Manley |
| 8,090,366 | B2 | 1/2012 | McNamara et al. |

(Continued)

FOREIGN PATENT DOCUMENTS

| CN | 101056401 | 10/2007 |
| JP | 3-129443 | 6/1991 |

(Continued)

OTHER PUBLICATIONS

E. Nebel et al., "Form-based File Upload in .HTML", Network Working Group, Nov. 1, 1995, 13 pages.

(Continued)

Primary Examiner — Michael Pham
(74) Attorney, Agent, or Firm — The Farrell Law Firm, P.C.

(57) ABSTRACT

A method and apparatus for transmitting, receiving, and storing files based on a predetermined container structure are provided. The method includes identifying some or all of files to be transmitted among the stored files; generating transmission information for the identified files and transmitting the transmission information to the receiving device; configuring a header including information about the location of the directory in which each of the identified files is to be stored; and adding the configured header to each of the identified files and transmitting the header-added files to the receiving device.

26 Claims, 11 Drawing Sheets

(56) References Cited

U.S. PATENT DOCUMENTS

| | | | |
|---|---|---|---|
| 2005/0074008 A1* | 4/2005 | Herledan | H04L 12/5692 |
| | | | 370/392 |
| 2007/0260615 A1* | 11/2007 | Shen | H04L 67/06 |
| 2007/0260616 A1* | 11/2007 | Shen | H04L 29/06027 |
| 2007/0286279 A1 | 12/2007 | Hamanaka | |
| 2008/0282355 A1* | 11/2008 | Nemazi | G06F 17/3012 |
| | | | 726/26 |
| 2009/0006724 A1* | 1/2009 | Chang | G06F 21/10 |
| | | | 711/103 |
| 2009/0037433 A1 | 2/2009 | Nakamura et al. | |
| 2009/0049099 A1* | 2/2009 | Cho et al. | 707/104.1 |
| 2009/0106666 A1* | 4/2009 | Nomura | 715/748 |
| 2010/0082672 A1 | 4/2010 | Kottomtharayil et al. | |
| 2010/0180028 A1* | 7/2010 | Deason | H04L 29/12528 |
| | | | 709/225 |
| 2011/0029619 A1 | 3/2011 | Bai | |
| 2011/0246660 A1* | 10/2011 | Bouazizi | H04L 65/4084 |
| | | | 709/231 |

FOREIGN PATENT DOCUMENTS

| | | |
|---|---|---|
| JP | 2002-358228 | 12/2002 |
| JP | 2011-518373 | 6/2011 |
| WO | WO 2009/121057 | 10/2009 |
| WO | WO 2011/108893 | 9/2011 |

OTHER PUBLICATIONS

Scott Hanselman: "A Back to Basics Case Study: Implementing HTTP File Upload with ASP.NET MVC including Tests and Mocks", Jun. 28, 2008, 6 pages.

European Search Report dated Jan. 18, 2016 issued in counterpart application No. 13800013.8-1853, 9 pages.

Chinese Office Action dated Sep. 5, 2016 issued in counterpart application No. 201380029457.9, 15 pages.

Japanese Office Action dated Apr. 24, 2017 issued in counterpart application No. 2015-515948, 8 pages.

Japanese Office Action dated Aug. 7, 2017 issued in counterpart application No. 2015-515948, 9 pages.

* cited by examiner

APPARATUS AND METHOD FOR TRANSMITTING AND RECEIVING FILES IN GENERAL PURPOSE DEVICE

PRIORITY

This application claims priority under 35 U.S.C. § 119(a) to a Korean Patent Application filed in the Korean Intellectual Property Office on Jun. 5, 2012 and assigned Serial No. 10-2012-0060643 and a Korean Patent Application filed in the Korean Intellectual Property Office on May 31, 2013 and assigned Serial No. 10-2013-0062611, the entire disclosures of both of which are incorporated herein by reference.

BACKGROUND OF THE INVENTION

1. Field of the Invention

The present invention relates generally to an apparatus and method for transmitting and receiving files in a general purpose device, and more particularly, to an apparatus and method for transmitting and receiving files, while maintaining a file container structure.

2. Description of the Related Art

Typically, a general purpose device refers to a device that is not used for a specific purpose, but instead may be used for many general purposes, and may freely interwork with other general purpose devices for general purposes. The general purpose device may freely exchange files with other general purpose devices, for, e.g., file sharing.

In general purpose devices, files are stored or written based on a container structure such as a tree structure. As the content viewed, stored, and edited on general purpose devices is increasingly diversified, the container structure in which files are stored becomes more and more important. For this reason, during file transfer between general purpose devices, the receiving general purpose device must store any files it receives in accordance with the exact container structure in which those files were stored in the sending device.

FIG. 1 illustrates an example of a container structure for storing files.

The container structure illustrated in FIG. 1 is comprised of root directory '/' 110, and its sub directories 'A' 112, 'B' 114, and 'C' 116. Directory 'A' 112 is a child directory that has root directory 110 as its parent directory. Directory 'B' 114 is a child directory that has directory 'A' 112 as its parent directory. Directory 'C' 116 is a child directory that has directory 'B' 114 as its parent directory.

Although each parent directory is coupled to a single child directory in FIG. 1, the container structure may be configured in various other forms, in which, e.g., multiple child directories are coupled to one parent directory.

In FIG. 1, file #1 120 is recorded in root directory 110, file #2 122 is recorded in directory 'A' 112, and file #3 124 is recorded in directory 'B' 114.

In order for a general purpose device to transfer files that are stored in a container structure like FIG. 1 to another general purpose device, the sending general purpose device must send both information about the container structure and the files which are to be stored in the container structure to the receiving general purpose device.

The receiving general purpose device configures a container in which it will store the files, based on the information about the container structure which it received from the sending general purpose device, and stores the received data for the files in the corresponding directory or directories in the configured container structure. In this way, the receiving general purpose device stores the files in the same container structure as the sending general purpose device.

FIG. 2 illustrates an example of conventional signal processing for file transfer between general purpose devices. In the signal processing example illustrated in FIG. 2, the files stored in the container structure illustrated in FIG. 1 are being transferred.

Referring to FIG. 2, the sending general purpose device ('sender') 10 transmits the file recorded in each directory to the receiving general purpose device ('receiver') 20 (see transmission of file #1 in step 210, file #2 in step 220, and file #3 in step 230). After transmitting each file, sender 10 transmits control information for creating the directory in which the transmitted file is to be stored (see transmission of 'mkdir' command in steps 212, 222 and 232), and then transmits control information for changing or moving to the directory in which the transmitted file is to be stored (see transmission of 'ckdir' command in steps 214, 224 and 234).

Thus, every time it transmits one file, sender 10 must also transmit control information about the directory receiver 20 will need to create, and control information so that receiver 20 will move or change to the directory it will store the transmitted file in.

As specifically shown in FIG. 1, sender 10 sequentially transmits file #1 120, file #2 122 and file #3 124.

First, sender 10 transmits file #1 120 in step 210, transmits control information to create root directory '/' 110 ('mkdir /') in which file #1 120 will be stored in step 212, and then transmits control information for receiver 20 to move to the root directory '/' 110 ('chdir /') in which file #1 120 will be stored in step 214. Conversely, receiver 20 receives file #120 in step 210, creates root directory '/' 110 for storing received file #1 120 in step 212, and moves to root directory '/' 110 to store received file #1 120 therein in step 214.

Second, sender 10 transmits file #2 122 in step 220, transmits control information to create directory 'A' 112 ('mkdir A') for storing file #2 122 in step 222, and transmits control information for receiver 20 to move to directory 'A' 112 ('chdir A') for storing file #2 122 in step 224. Conversely, receiver 20 receives file #2 122 in step 220, creates directory 'A' 112 for storing received file #2 122 in step 222, and moves to directory 'A' 112 for storing received file #2 122 therein, in step 224.

Third, sender 10 transmits file #3 124 in step 230, transmits control information to create directory 'B' 114 ('mkdir B') for storing file #3 124 in step 232, and transmits control information for receiver 20 to move to directory 'B' 114 ('chdir B') for storing file #3 124 in step 234.

Conversely, receiver 20 receives file #3 124 in step 230, creates directory 'B' 114 for storing received file #3 124 in step 232, and moves to directory 'B' 114 for storing received file #3 124 therein in step 234.

A protocol that could be used for transmitting and receiving files in accordance with the procedure illustrated in FIG. 2 is the File Transfer Protocol (FTP) (IETF RFC 765).

When the container structure is more complicated, the amount of control information that the sender has to provide to the receiver in the procedure illustrated in FIG. 2 increases.

FIG. 3 illustrates another example of conventional signal processing for file transfer between general purpose devices. The files stored in the container structure illustrated in FIG. 1 are being transferred in FIG. 3.

In the example illustrated in FIG. 3, the sender provides, in advance to the receiver, information about the location (for example, a Uniform Resource Locator (URL)) where content to be delivered can be acquired, as well as information about the container structure, and the receiver stores the received files in a container structure replicated using the information received in advance.

Referring to FIG. 3, sender 10 configures a metadata file including information about the content to be transmitted and the container structure, and transmits the configured metadata file to receiver 20 in step 310. The metadata file may include information about the location (for example, the URL) where at least one file corresponding to the content to be delivered is stored, and information about the container structure.

Receiver 20 acquires the location information corresponding to each of the three files (file #1 120, file #2 122 and file #3 124) to be received, and information about the container structure in which the files are to be stored, from the metadata file received from sender 10.

First, receiver 20 retrieves file #1 120 using the acquired location information, and then stores it in root directory '/' 110 based on the acquired information about the container structure in step 312.

Second, the receiver 20 retrieves file #2 122 using the acquired location information, and stores it in directory 'A' 112 based on the acquired information about the container structure in step 314.

Third, the receiver 20 retrieves file #3 124 using the acquired location information, and stores it in directory 'B' 114 based on the acquired information about the container structure in step 316.

Although receiver 20 in FIG. 3 retrieves files from sender 10, it will be apparent to those of ordinary skill in the art that receiver 20 may retrieve desired files from other locations besides sender 10, such as from other general purpose devices.

Alternatively, receiver 20 may store the received files in accordance with another container structure, ignoring the information about the container structure which sender 10 has transmitted, depending on how receiver 20 is implemented.

In the procedure illustrated in FIG. 3, receiver 20 can determine, before the files are actually transmitted, in which container structure the files will be stored, thus allowing its user to identify the files and determine whether to accept the file transmission, before the actual file transmission starts.

However, in the conventional method in FIG. 3, sender 10 must use processing resources to both generate content and generate information about the container structure holding that content; when the container structure of the content to be transmitted is complicated and/or if there is a lot of content, such extra processing may cause unnecessary time delays.

SUMMARY OF THE INVENTION

An aspect of the present invention is to address at least the above-mentioned problems and/or disadvantages and to provide at least the advantages described below. Accordingly, an aspect of the present invention is to provide a file transmission/reception apparatus and method for reducing the file transmission/reception control procedure between general purpose devices.

Another aspect of the present invention is to provide a file transmission/reception apparatus and method for reducing the required file transmission/reception time between general purpose devices.

Further another aspect of the present invention is to provide a file transmission/reception apparatus and method, in which during file transmission/reception between general-purpose devices, the file container structure of the content to be transmitted by the sending general purpose device (or sender) is maintained in the receiving general purpose device (or receiver).

Yet another aspect of the present invention is to provide an apparatus and method, in which a sending general purpose device transmits information about the location where a transmission file for specific content is stored, along with header information of the transmission file.

Still another aspect of the present invention is to provide an apparatus and method, in which a receiving general purpose device stores a received file based on location information acquired from a header of the received file.

Still another aspect of the present invention is to provide an apparatus and method, in which a sending general purpose device transfers some control information in a distributed manner using a metadata file, the control information allowing a receiving general purpose device to store the files being transmitted in accordance with a predetermined container structure.

Still another aspect of the present invention is to provide an apparatus and method for transmitting control information in a header of a file transmitted with a metadata file in a distributed manner, the control information being provided to store a file transferred between general-purpose devices in accordance with a predetermined container structure.

Still another aspect of the present invention is to provide a signal processing procedure for transferring a metadata file including some of the control information used to store a file transferred between general-purpose devices in accordance with a predetermined container structure.

In accordance with an aspect of the present invention, there is provided a method for a first device to transmit files stored in a predetermined container structure to a second device. The method includes identifying some or all of files to be transmitted among the stored files; generating transmission information for the identified files and transmitting the transmission information to the second device; configuring a header, for each of the identified files, including information about a location of the directory in which the identified file is to be stored; and adding the configured header to each corresponding identified file and transmitting the header-added files to the second device.

In accordance with another aspect of the present invention, there is provided an apparatus for transmitting files. The apparatus includes a storage configured to store files depending on a predetermined container structure; a message generator configured to identify some or all of files to be transmitted among the files stored in the storage, to generate transmission information for the identified files, to configure, for each of the identified files, a header including information about a location of a directory in which each of the identified files is to be stored, to add the configured header to each of the identified files, and to generate a transport message; and a transmitter configured to transmit the transmission information generated by the message generator to a receiving device, and to send the transport message generated by the message generator to the receiving device.

In accordance with further another aspect of the present invention, there is provided a method for receiving and storing files in accordance with a predetermined container structure. The method includes receiving metadata including some of control information required to store the files in one or more directories arranged in accordance with the predetermined container structure; receiving some or all of the files; and storing the received files in directories arranged in accordance with the predetermined container structure based on some control information received in the metadata and control information included in a header of each of the received files. The control information included in each header is information about a location for the corresponding file, which is used to select a storage location arranged in accordance with the predetermined container structure.

In accordance with yet another aspect of the present invention, there is provided an apparatus for receiving and storing files in accordance with a predetermined container structure. The apparatus includes a receiver configured to receive metadata including some of control information required to store the files arranged in accordance with the predetermined container structure, and to receive some or all of the files; a message handler configured to determine in which directory each of the received files is to be stored, in accordance with the predetermined container structure, based on some control information received in the metadata and control information included in a header of each of the received files; and a storage configured to store each of the received files in the directory determined by the message handler among the directories arranged in accordance with the predetermined container structure. The control information included in the header includes information about a storage location for the file, which is used to select one of the directories arranged in accordance with the predetermined container structure.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EMBODIMENTS OF THE PRESENT INVENTION

The following description with reference to the accompanying drawings is provided to assist in a comprehensive understanding of embodiments of the invention as defined by the claims and their equivalents. It includes various specific details to assist in that understanding but these are to be regarded as mere examples. Accordingly, those of ordinary skilled in the art will recognize that various changes and modifications of the embodiments described herein can be made without departing from the scope and spirit of the invention. In addition, descriptions of well-known functions and constructions may have been omitted for clarity and conciseness.

The terms and words used in the following description and claims are not limited to the dictionary meanings, but, are merely used by the inventor to enable a clear and consistent understanding of the invention. Accordingly, it should be apparent to those skilled in the art that the following description of embodiments of the present invention is provided for illustration purpose only and not for the purpose of limiting the invention as defined by the appended claims and their equivalents.

It is to be understood that the singular forms "a," "an," and "the" include the plural unless the context clearly dictates otherwise. Thus, for example, reference to "a component surface" includes reference to one or more of such surfaces.

Embodiments will be described in detail below, in which a sending general purpose device transfers the files, which are stored in accordance with a container structure, to a receiving general purpose device.

To this end, a new and beneficial content transmission/reception procedure between a sending general purpose device and a receiving general purpose device will be defined. A variety of examples in accordance with this newly defined procedure are provided in which a sending general purpose device efficiently transfers the content transmission/reception control information to a receiving general purpose device with simplified steps, preventing the loss of time.

In one embodiment of the present invention, information about the container structure for storing the files is transmitted in each of files, and if necessary, some control information is transferred in advance using a metadata file. For this purpose, in addition to the definition of the control information to be transferred in a metadata file, a procedure for transferring the metadata file should be prepared.

Although the term 'general purpose device' will be used in the following description for convenience purpose only, it will be apparent to those of ordinary skill in the art that a variety of embodiments may be applied to any other devices capable of file transfer.

Embodiments of the present invention will now be described in detail with reference to the accompanying drawings.

Figure 4:
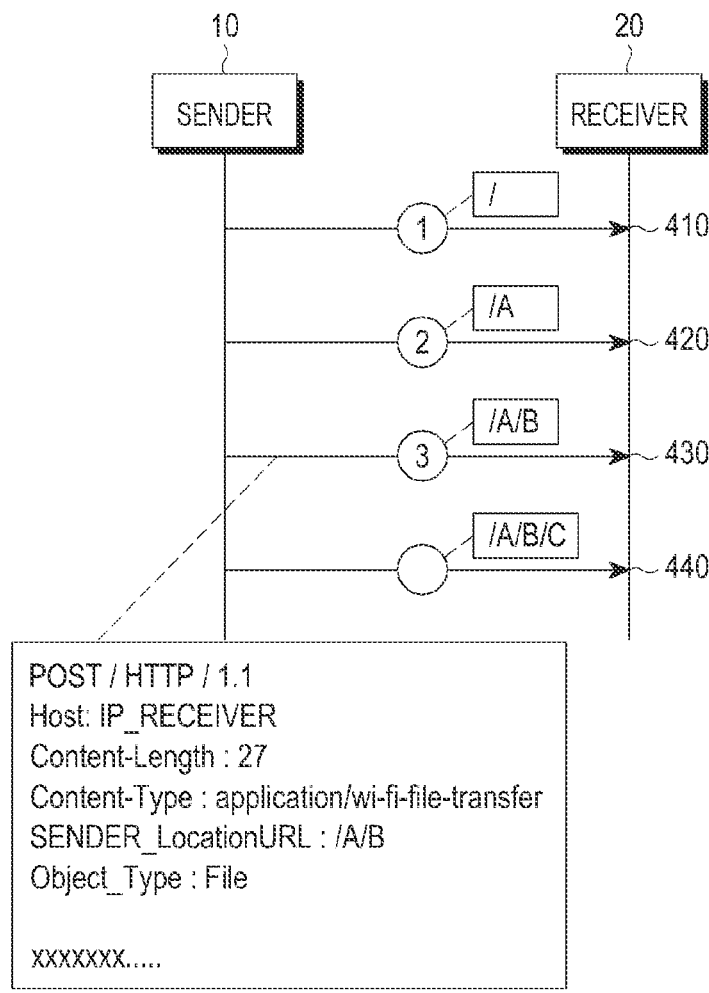
FIG. 4 illustrates an example of a signal processing procedure for file transfer between general purpose devices according to an embodiment of the present invention.

FIG. 4 illustrates an example of a signal processing procedure for file transfer between general purpose devices according to an embodiment of the present invention. The signal processing procedure illustrated in FIG. 4 is transferring the files stored in the container structure illustrated in FIG. 1.

Referring to FIG. 4, sending general purpose device ('sender') 10 transmits the file recorded in each directory to a receiving general purpose device ('receiver') 20 (see steps 410, 420, and 430). The sender 10 transmits information about the location in which a file is to be stored, along with the file being transmitted. For example, information about the location, in which a file is to be stored, may be included in a header of the file.

In the embodiment shown in FIG. 4, sender 10 sequentially transmits file #1 120, file #2 122 and file #3 124.

When transmitting file #1 120, sender 10 includes information indicating root directory '/' 110 in a header of file #1 120 as information about the location in which file #1 120 is to be stored. In this case, receiver 20 receives file #1 120 and checks the location information included in the header of received file #1 120, thereby storing received file #1 120 in root directory '/' 110.

When transmitting file #2 122, sender 10 includes information indicating directory 'A' 112 in a header of file #2 122 as information about the location in which the file #2 122 is to be stored. In this case, receiver 20 receives file #2 122 and checks the location information included in the header of received file #2 122, thereby storing received file #2 122 in directory 'A' 112.

In this and other embodiments, the location information indicating directory 'A' 112 may include not only the information indicating directory 'A', but also information about its parent directory. In other words, the location information included in the header information of file #1 120 may indicate that directory 'A' 112 is a child directory that has root directory '/' 110 as its parent directory.

When transmitting file #3 124, sender 10 includes information indicating directory 'B' 114 in a header of file #3 124 as information about the location in which file #3 124 is to be stored. In this case, receiver 20 receives file #3 124 and checks the location information included in the header of received file #3 124, thereby storing received file #3 124 in directory 'B' 114.

In this and other embodiments, the location information indicating directory 'B' 114 may include not only the information indicating directory 'B', but also information about its parent directory. In other words, the location information included in the header information of the file #2 122 may indicate that directory 'B' 114 is a child directory that has directory 'A' 112 as its parent, and that directory 'A' 112 is a child directory of root directory '/' 110 as its parent directory.

In summarizing the example illustrated in FIG. 4, during transmission of content files (or content-related files), each file is configured to include information about the container structure in which the file is to be stored. In some embodiments of the present invention, this additional information may be defined in the header of a Hypertext Transfer Protocol (HTTP) POST message, and may include, for example, the relative path information of the file.

In the example shown in FIG. 4, for indicating the storage location of a file to be transmitted, the HTTP POST header includes additional information such as host information 'Host', content length information 'Content-Length', content type information 'Content-Type', file location information 'SENDER_LocationURL', and file type information 'Object_Type'.

As a result, a receiver may store a received file in the appropriate location based on its relative path information, thereby maintaining the container structure used in the sender.

In the above-described various embodiments, the container structure information is not transmitted using a metadata file. Therefore, there is a need to define a transmission scheme for container structure information using a metadata file, as will be discussed below.

Figure 5:
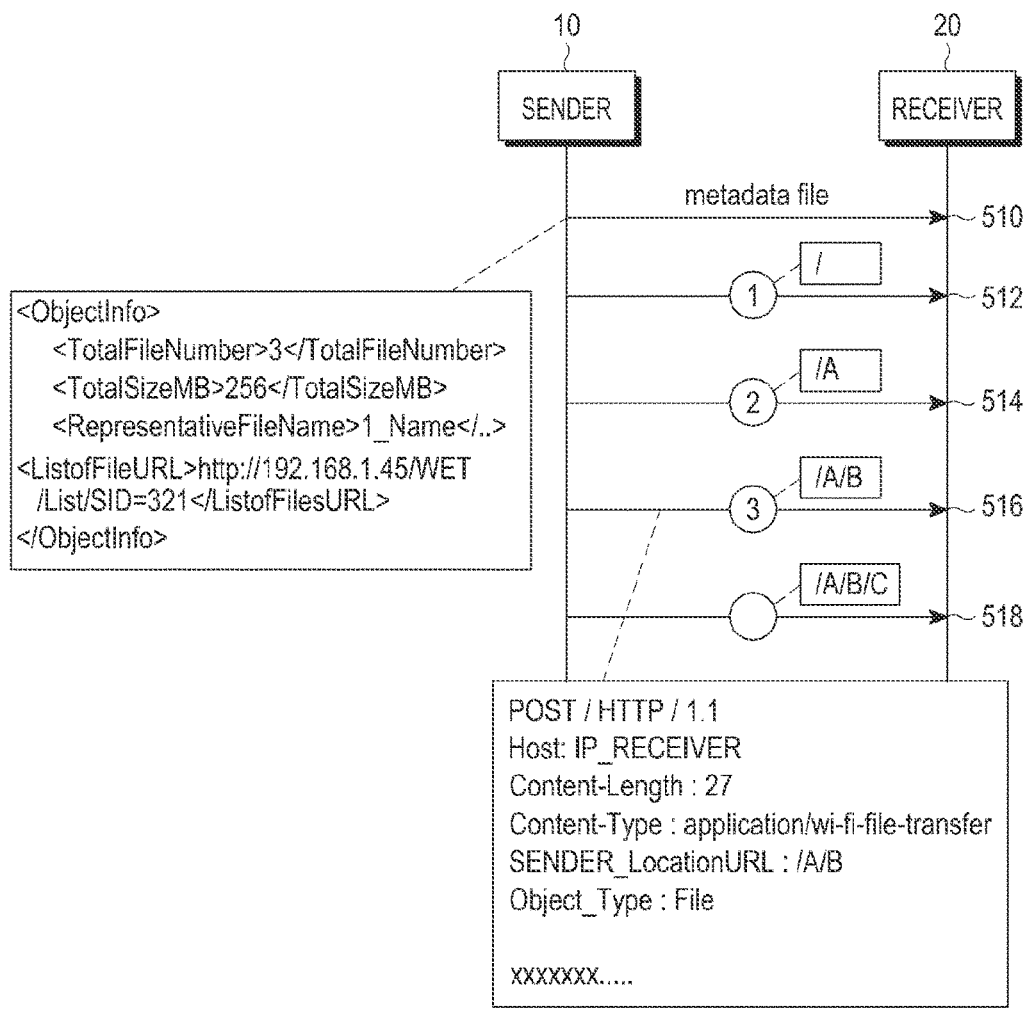
FIG. 5 illustrates another example of a signal processing procedure for file transfer between general purpose devices according to an embodiment of the present invention.

FIG. 5 illustrates another example of a signal processing procedure for file transfer between general purpose devices according to an embodiment of the present invention. The example illustrated in FIG. 5 is a hybrid transmission scheme which minimizes the control information that is sent in advance in the metadata file, and sends most of the control information during content file transmission. The files being transferred by the signal processing procedure illustrated in FIG. 5 are those stored in the container structure illustrated in FIG. 1.

Referring to FIG. 5, sender 10 configures a metadata file to include the least amount of control information used to receive content files, and transmits the configured metadata file to a receiver 20, in step 510.

For example, the least amount of control information included in the metadata file may include control information that is commonly required to receive content files. In the example shown in FIG. 5, the metadata file is comprised of the total number 'TotalFileNumber' of files to be transmitted, the total file size 'TotalSizeMB', the representative file name 'RepresentativeFileName', the file list-recorded location 'ListofFilesURL', and the like. As illustrated, it can be appreciated that the metadata file is comprised of control information which is to be applied in common to all content files to be transmitted.

After transmitting the metadata file, sender 10 transmits the file stored in each directory to the receiver 20 (see steps 512, 514, and 516). A header of each file transmitted by the sender 10 includes information about the location in which the file is to be stored.

In the embodiment shown in FIG. 5, sender 10 sequentially transmits file #1 120, file #2 122 and file #3 124.

When transmitting file #1 120, sender 10 includes information indicating root directory '/' 110 in a header of file #1 120 as information about the location in which file #1 120 is to be stored, in step 512. In this case, receiver 20 receives file #1 120 and checks the location information included in the header of received file #1 120, thereby storing received file #1 120 in root directory '/' 110.

When transmitting file #2 122, sender 10 includes information indicating directory 'A' 112 in a header of file #2 122 as information about the location in which file #2 122 is to be stored, in step 514. In this case, receiver 20 receives file #2 122 and checks the location information included in the header of received file #2 122, thereby storing received file #2 122 in directory 'A' 112.

In this and other embodiments, the location information indicating directory 'A' 112 may include not only the information indicating directory 'A', but also information about its parent directory. In other words, the location information included in the header of file #1 120 may indicate that directory 'A' 112 is a child directory that has root directory '/' 110 as its parent directory.

When transmitting file #3 124, sender 10 includes information indicating directory 'B' 114 in a header of file #3 124 as information about the location in which file #3 124 is to be stored, in step 516. In this case, receiver 20 receives file

3 124 and checks the location information included in the header of received file #3 124, thereby storing received file #3 124 in directory 'B' 114.

In this and other embodiments, the location information indicating directory 'B' 114 may include not only the information indicating directory 'B', but also information about its parent directory. In other words, the location information included in the header information of file #2 122 may indicate that directory 'B' 114 is a child directory that has directory 'A' 112 as its parent directory, and directory 'A' in turn is a child directory that has root directory '/' 110 as its parent directory.

In summarizing the example illustrated in FIG. 5, during transmission of content files, each file is configured to include information about the container structure in which its content is to be stored. As shown in the example of FIG. 5, for location information for storing the file being transmitted, its header may include additional information such as host information 'Host', content length information 'Content-Length', content type information 'Content-Type', file location information 'SENDER_LocationURL', and file type information 'Object_Type'.

In the example of FIG. 5, when a sender transmits a metadata file configured to include information about the location (for example, a URL) in which a list of files to be transmitted can be acquired, a receiver may acquire the full list of files using the URL, if it requires additional file list information.

Figure 6:
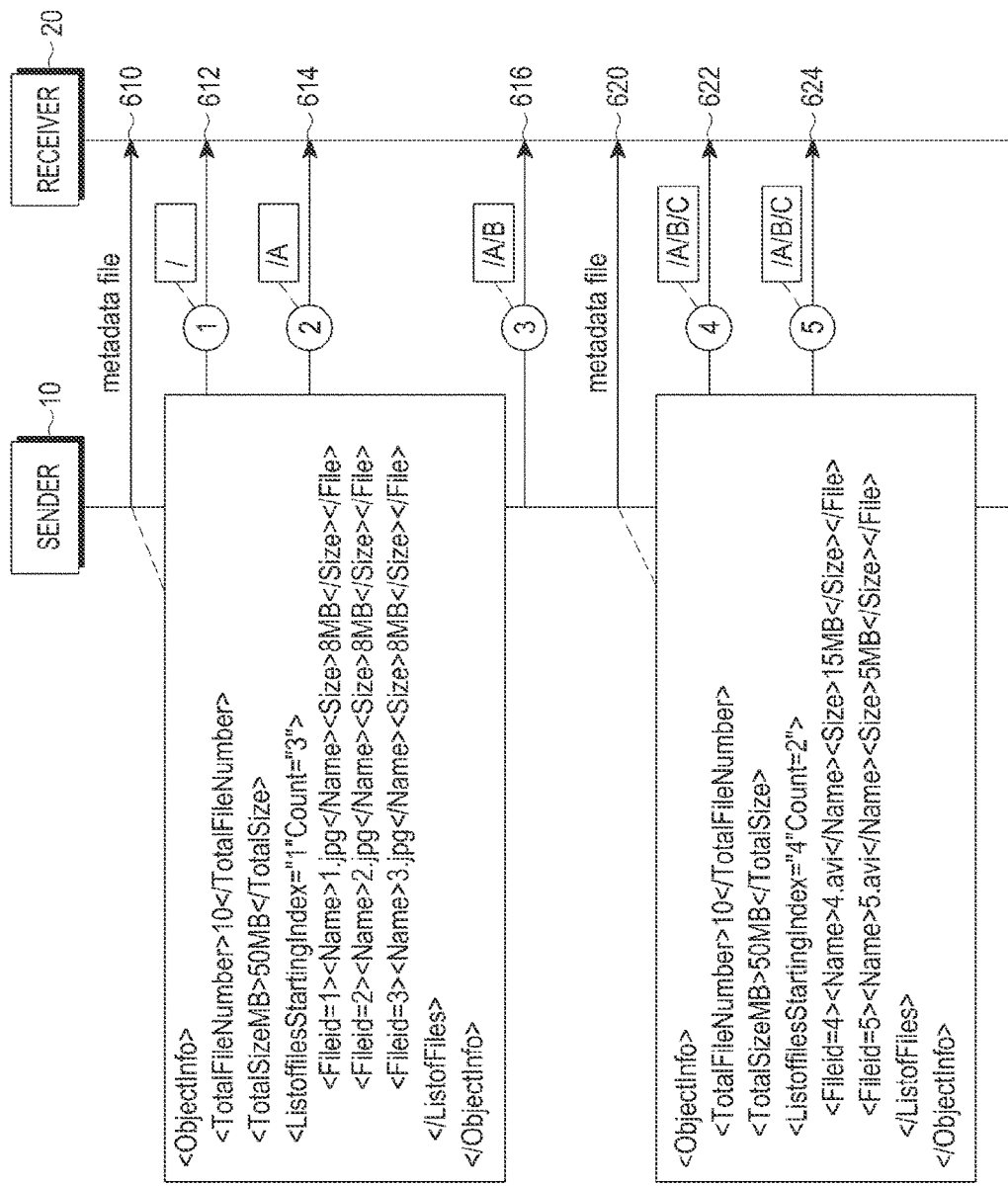
FIG. 6 illustrates a further example of a signal processing procedure for file transfer between general purpose devices according to an embodiment of the present invention.

FIG. 6 illustrates another example of a signal processing procedure for file transfer between general purpose devices according to an embodiment of the present invention.

The example illustrated in FIG. 6 is based on a hybrid transmission scheme which minimizes the control information that is sent in advance in the metadata file, and sends most of the control information during content file transmission. Steps 610 to 616 in FIG. 6 correspond to steps 510 to 516 in FIG. 5.

However, unlike the procedure illustrated in FIG. 5, the procedure illustrated in FIG. 6 additionally includes a procedure for transmitting an additional update metadata file for updating the control information that is transmitted by the initial metadata file.

Referring to FIG. 6, sender 10 transmits an update metadata file to receiver 20 in step 620. The type of the control information constituting the update metadata file to be transmitted may be the same as the type of the control information constituting the initially transmitted metadata file. However, at least one of the types of the control information constituting the update metadata file must have a value different from that of the control information constituting the initially transmitted metadata file.

After an update metadata file is transmitted (as, for example, in step 620), additional files (for example, files #4 and #5) may be transmitted by sender 10 (as, for example, in step 622) and received by receiver 20 (as, for example, in step 624), based on the control information constituting the update metadata file.

In FIG. 5, the receiver 20 receives file #1 120, file #2 122 and file #3 124, which are sequentially transmitted by sender 10, and stores them, in accordance with the control information constituting the initially transmitted metadata file and the control information included in the header of each file.

In order to send additional files #4 and #5, an update metadata file is sent in step 620. Based on the control information constituting the update metadata file and the control information included in a header of each file, receiver 20 receives files #4 and #5, which are sequentially transmitted by sender 10, and stores them in accordance with the defined container structure.

When transmitting files #4 and #5, sender 10 includes information indicating directory 'C' 116 in the headers of files #4 and #5 as information about the location in which files #4 and #5 are to be stored, in steps 622 and 624. In this case, receiver 20 receives files #4 and #5 and checks the location information included in the headers of received files #4 and #5, thereby storing received files #4 and #5 in directory 'C' 116.

In this and other embodiments, the location information indicating directory 'C' 116 may include not only the information indicating directory 'C', but also information about its parent directory. In other words, the location information included in the header of files #4 and #5 may indicate that directory 'C' 116 is a child directory having directory 'B' 114 as its parent directory; directory 'B' 114 is a child directory having directory 'A' 112 as its parent directory; and directory 'A' 112 is a child directory having root directory '/' 110 as its parent directory.

In summarizing the example illustrated in FIG. 6, during transmission of content files, each file is configured to include information about the container structure in which its content is to be stored. In the example shown in FIG. 6, for location information about the storage location of the file being transmitted, its header may include additional information such as host information 'Host', content length information 'Content-Length', content type information 'Content-Type', file location information 'SENDER_LocationURL', and file type information 'Object_Type'.

In the above-described embodiment, the first transmitted initial metadata file and the additionally transmitted update metadata file may include information about the total number of files to be transmitted and the total size of files to be transmitted. In order to express some of the file list, they may further include indices of, and the number of file lists included in, the metadata file among all the files, and name and size information of each file. The information may further include a resource URL where each file may be acquired. In this embodiment, receiver 20 acquires content using the HTTP GET method.

Various possible examples of transmitting the container structure information according to an embodiment of the present invention will be defined below.

Figure 7:
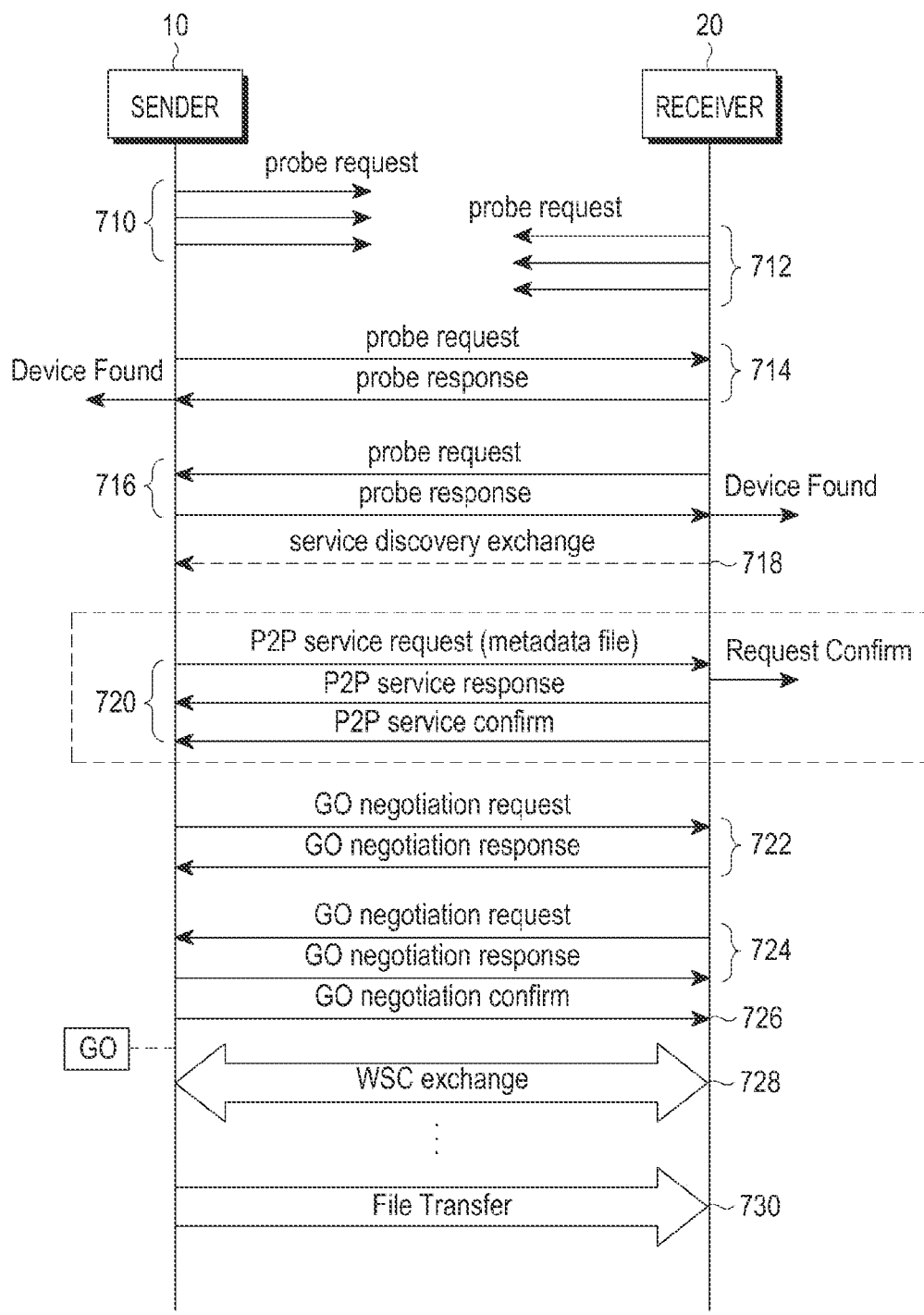
FIG. 7 illustrates an example of exchanging container structure information between general purpose devices according to an embodiment of the present invention.

FIG. 7 illustrates an example of exchanging container structure information between general purpose devices according to an embodiment of the present invention. In the example of FIG. 7, the container structure information is transmitted before group formation.

Referring to FIG. 7, sender 10 and receiver 20 periodically or aperiodically send a probe request message for discovering nearby general purpose devices, in steps 710 and 712.

Upon receiving the probe request message sent by sender 10, receiver 20 sends a probe response message to sender 10 in step 714. Sender 10 finds receiver 20 by receiving the probe response message sent by receiver 20.

Upon receiving the probe request message sent by receiver 20, sender 10 sends a probe response message to receiver 20 in step 716. Receiver 20 finds sender 10 by receiving the probe response message sent by sender 10.

By this operation, sender 10 and receiver 20 find each other.

After finding each other, sender 10 and receiver 20 perform a service discovery exchange procedure for exchanging service information about each other, in step 718. For example, the service discovery exchange procedure may be an operation in which sender 10 determines whether receiver 20 supports a service that sender 10 will provide. The service discovery exchange procedure may be performed when receiver 20 responds to a query of sender 10.

Thereafter, sender 10 and receiver 20 perform an initial setup procedure for Peer-to-Peer (P2P) service in step 720. In the initial setup procedure for P2P service, sender 10 transmits a metadata file for file transfer, to receiver 20.

In the example of FIG. 7, the sender 10 sends to receiver 20 a P2P service request message for requesting a P2P service. When sending the P2P service request message, sender 10 includes a metadata file in the P2P service request message.

Upon receiving the P2P service request message, receiver 20 determines whether to accept the P2P service requested by sender 10. Receiver 20 acquires the metadata file from the P2P service request message.

Upon determining to accept the P2P service requested by sender 10, receiver 20 sends to sender 10 a P2P service response message responsive to the P2P service request message and a P2P service confirm message for confirming or permitting the P2P service.

After the metadata file is transmitted to receiver 20 by sender 10 in the above operation, a group formation procedure is performed in steps 722 and 724.

The group formation procedure includes a procedure for determining the Group Owner (GO) for the P2P service. For example, sender 10 sends, to receiver 20, a GO negotiation request message for requesting a negotiation of a GO, for group formation. In response, receiver 20 sends a GO negotiation response message to sender 10. These two steps comprise steps 722 in FIG. 7.

Similarly, for group formation, receiver 20 sends a GO negotiation request message for requesting a negotiation of a GO, to sender 10. In response, sender 10 sends, to receiver 20, a GO negotiation response message and a GO negotiation confirm message for confirming or accepting a GO. These two steps comprise steps 724 and 726 in FIG. 7.

In the example shown in FIG. 7, sender 10 is determined to be the GO.

Once the GO is determined, sender 10 and receiver 20 perform a Wi-Fi Simple Configure (WSC) exchange procedure in step 728. After the WSC exchange procedure, sender 10 transmits content files to receiver 20 in step 730. A header of each of the files being transmitted includes location information that is based on the container structure in which the files are to be stored.

In this operation, before determining a GO for group formation, sender transmits a metadata file to receiver 20.

Figure 8:
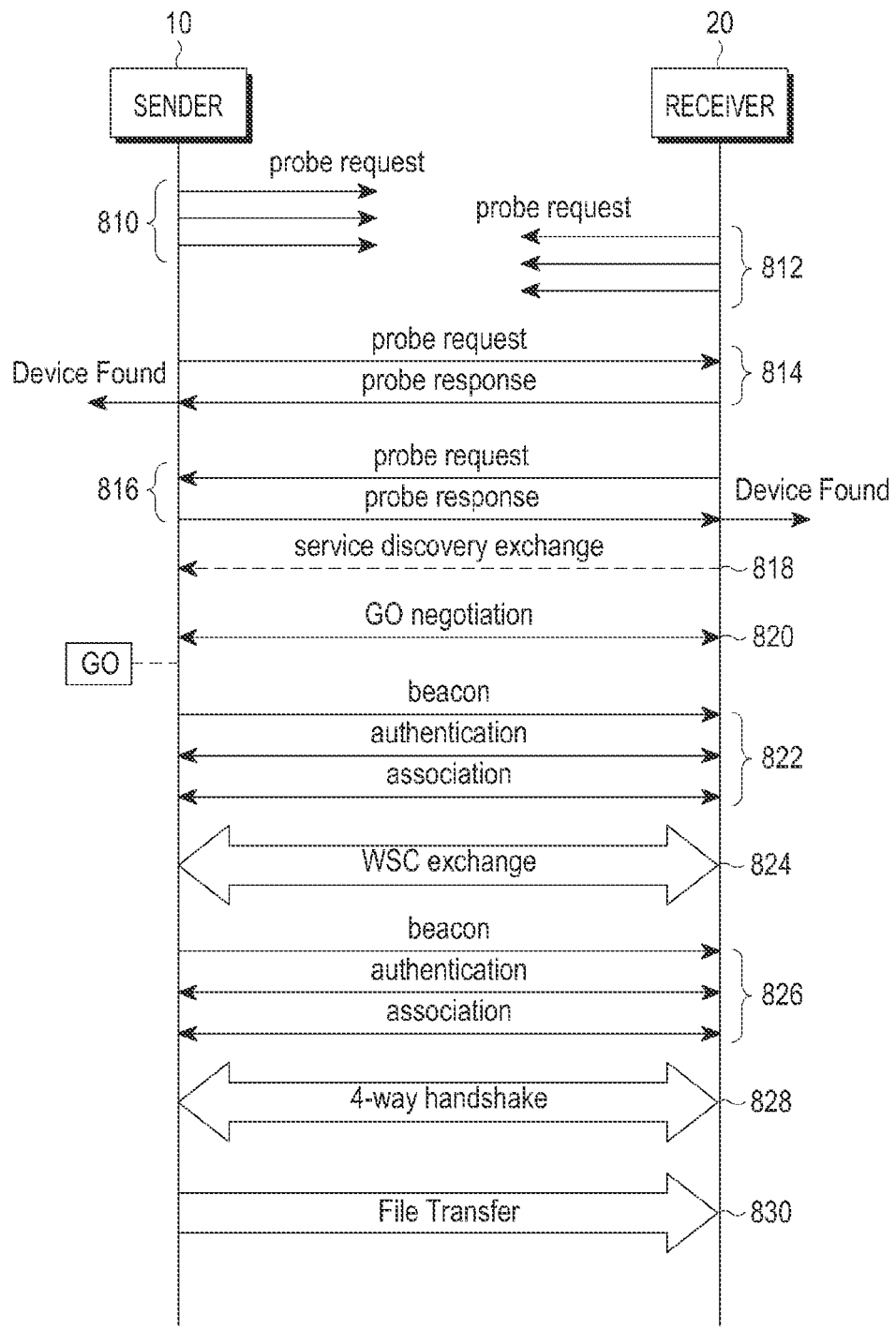
FIG. 8 illustrates another example of exchanging container structure information between general purpose devices according to an embodiment of the present invention.

FIG. 8 illustrates another example of exchanging container structure information between general purpose devices according to an embodiment of the present invention. In the example of FIG. 8, the container structure information is transmitted after group formation.

Referring to FIG. 8, sender 10 and receiver 20 periodically or aperiodically send a probe request message for discovering nearby general purpose devices, in steps 810 and 812.

Upon receiving the probe request message sent by sender 10, receiver 20 sends a probe response message to sender 10 in step 814. Sender 10 finds receiver 20 by receiving the probe response message sent by receiver 20.

Upon receiving the probe request message sent by receiver 20, sender 10 sends a probe response message to receiver 20 in step 816. Receiver 20 finds sender 10 by receiving the probe response message sent by sender 10.

By this operation, sender 10 and receiver 20 find each other.

After finding each other, sender 10 and receiver 20 perform a service discovery exchange procedure for exchanging service information about each other, in step 818.

Although not shown in the drawing, sender 10 and receiver 20 also perform an initial setup procedure for P2P service. For such an initial setup, sender 10 sends a P2P service request message for requesting P2P service, to receiver 20. Upon receiving the P2P service request message, receiver 20 determines whether to accept the P2P service requested by sender 10. Upon determining to accept the P2P service requested by sender 10, receiver 20 sends, to the sender, a P2P service response message responsive to the P2P service request message and a P2P service confirm message for confirming or permitting the P2P service.

After performing the initial setup for the P2P service, sender 10 and receiver 20 perform a group formation procedure in step 820. The group formation procedure in FIG. 8 is performed by the same procedure as steps 722, 724 and 726 in FIG. 7. Like FIG. 7, it is assumed in FIG. 8 that sender 10 is determined to be the GO.

Sender 10, which is determined to be the GO, performs authentication and association procedures for receiver 20 in steps 822 and 826. For such procedures, sender 10 periodically sends a beacon, which is a non-directional intermittent signal, using a specific frequency. Thereafter, at a request of receiver 20 having received the beacon, sender 10 performs authentication for receiver 20 in accordance with a predefined authentication procedure. Sender 10 performs association with receiver 20, if the authentication for receiver 20 is successful.

After undergoing authentication and association, sender 10 and receiver 20 perform a WSC exchange procedure in step 824.

Figure 9:
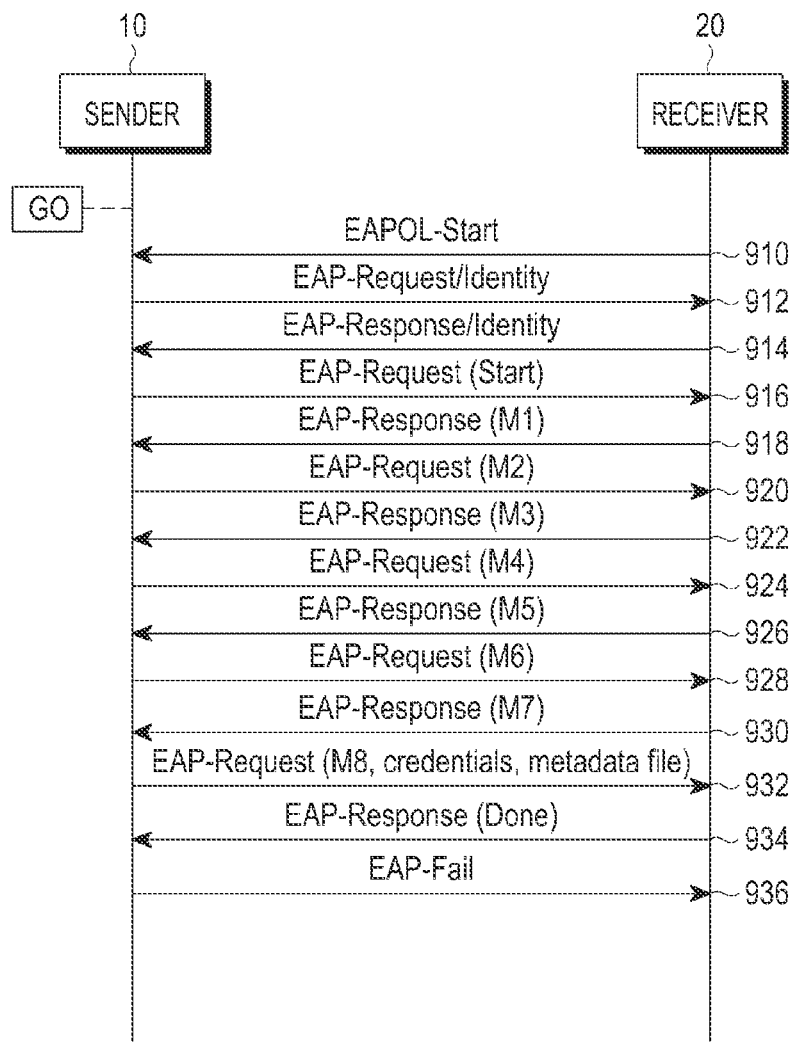
FIG. 9 illustrates a detailed example of the signal processing procedure for transferring a metadata file in FIG. 8.

When performing the WSC exchange procedure, sender 10 transmits, to receiver 20, a metadata file configured to include some control information for file transfer. An example of transferring a metadata file during WSC exchange performed in the group formation procedure is illustrated in FIG. 9. A detailed description thereof will be given later on.

Sender 10 and receiver 20, which have undergone the authentication and association, initialize the physical connection for file transfer. For example, sender 10 and receiver 20 initialize the Transmission Control Protocol (TCP) connection, which is a path for file transfer, by performing a 4-way handshake procedure. By the 4-way handshake procedure, sender 10 and receiver 20 recognize that they are ready to perform file transmission/reception before actually transmitting and receiving files.

In the 4-way handshake procedure, receiver 20 requests a connection from sender 10 which is determined as the GO. In this case, receiver 20 may send any synchronization (SYN) packet to sender 10. Upon receiving the synchronization packet from receiver 20, sender 10 sends an ACK signal and its synchronization packet to receiver 20 in response thereto. Upon receiving the synchronization signal from sender 10, receiver 20 sends an ACK signal to sender 10 in response thereto.

Once the 4-way handshake procedure is completed, sender 10 and receiver 20 may normally exchange files with each other.

Therefore, sender 10 transmits content files to receiver 20 in step 830. A header of each of the files being transmitted includes location information that is based on the container structure in which the files are to be stored.

In this operation, sender 10 transmits a metadata file to the receiver 20 in the group formation process.

FIG. 9 illustrates an example of a detailed signal processing procedure for transfer of a metadata file, which is proposed in FIG. 8. The signal processing procedure illustrated in FIG. 9 provides an example of transferring a metadata file by including it in an M8 message during WSC exchange.

Referring to FIG. 9, receiver 20 sends an EAPOL-Start message for requesting access according to the Extensible Authentication Protocol (EAP), to sender 10 in step 910.

Upon receiving the EAPOL-Start message, sender 10 sends an EAPOL-Request/Identity message for requesting EAP identification, to receiver 20 in step 912. In response to reception of the EAPOL-Request/Identity message, receiver 20 sends an EAPOL-Response/Identity message carrying its identity, to sender 10 in step 914.

Thereafter, sender 10 and receiver 20 perform a verification procedure for a predefined authentication key (for example, a PIN). For a PIN, the user may set it in advance for each general purpose device before the procedure illustrated in FIG. 9 starts.

Sender 10 sends, to receiver 20, an EAP-Request (Start) message for requesting start of the verification procedure for PIN in step 916. When the verification of the PIN is completed, receiver 20 sends, to sender 10, an EAP-Response (Done) message requesting termination of the PIN verification procedure in step 934.

In the PIN verification procedure, receiver 20 transmits preset PINs M1, M3, M5 and M7 to sender 10 using the predetermined message EAP-Response (M #), in steps 918, 922, 926 and 930. Sender 10 transmits preset PINs M2, M4, M6 and M8 to receiver 20 using the predetermined message EAP-Response (M #) in steps 918, 922, 926 and 930.

Sender 10 transmits a metadata file to receiver 20 using a predetermined message of EAP-Response (M8) in step 932.

Upon receiving an EAP-Response (Done) message requesting termination of the PIN verification procedure from receiver 20, sender 10 sends an EAP-Fail message instructing to terminate all the procedures, to receiver 20 in step 936.

In the example shown in FIG. 9, sender 10 transmits a metadata file over a WSC security channel, so the transmission files and the container structure information may be transmitted to receiver 20 more securely.

Figure 10:
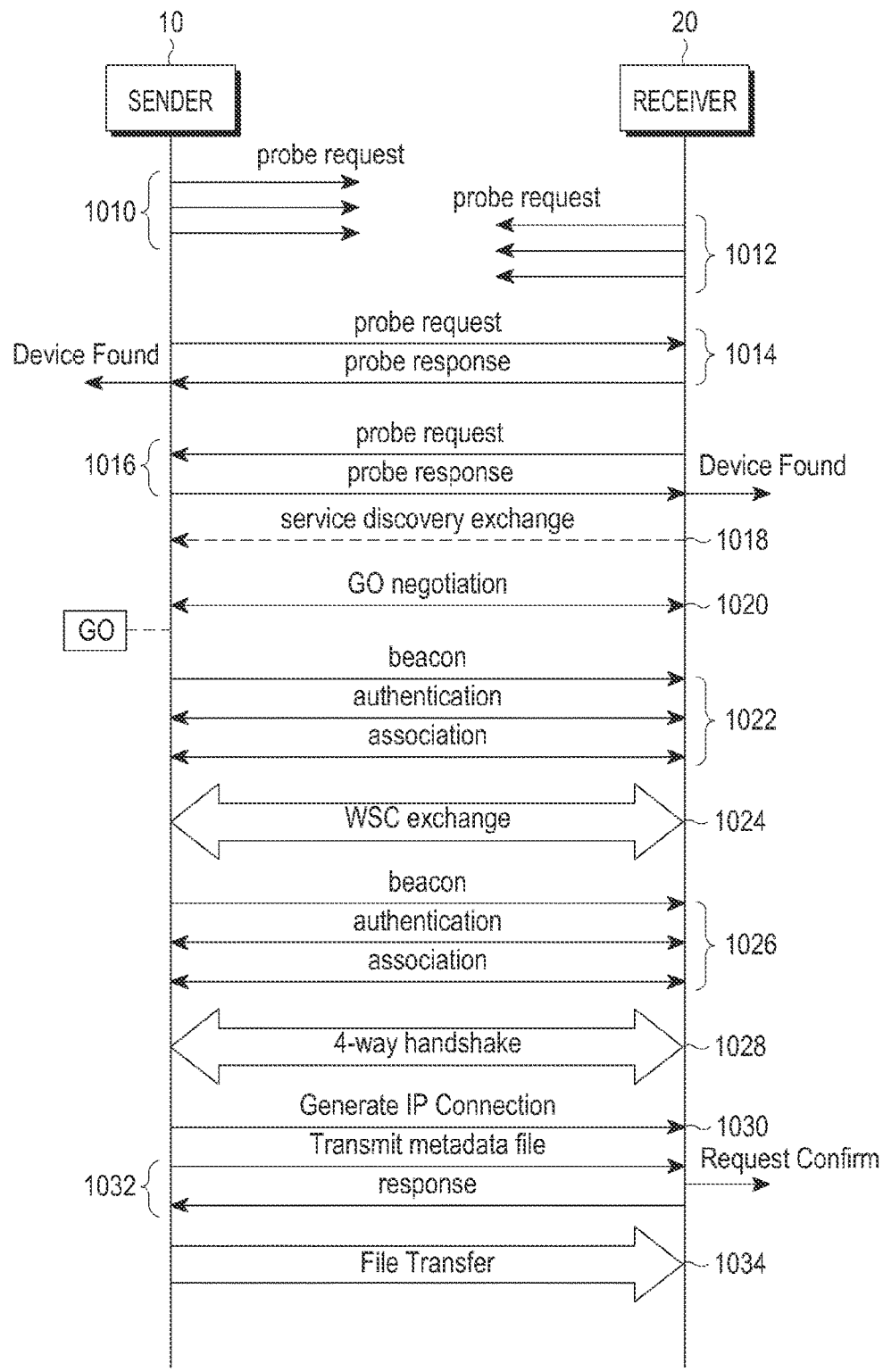
FIG. 10 illustrates a further example of exchanging container structure information between general purpose devices according to an embodiment of the present invention.

FIG. 10 illustrates another example of exchanging container structure information between general purpose devices according to an embodiment of the present invention. In the example of FIG. 10, the container structure information is transmitted after Internet Protocol (IP) assignment.

Steps 1010 to 1028 in the signal processing procedure illustrated in FIG. 10 correspond to steps 810 to 828 described in connection with FIG. 8. Therefore, a detailed description of steps 1010 to 1028 will be omitted in the following disclosure.

Referring to FIG. 10, sender 10 creates an IP connection to receiver 20 through a 4-way handshake procedure in step 1030. Sender 10 and receiver 20, between which the IP connection is created, perform a procedure for sharing some control information for content file transfer in step 1032.

Sender 10 transmits a metadata file based on the IP connection to receiver 20. The metadata file transmitted by sender 10 includes some control information for content file transfer. Some of the control information for file transfer which may be included in the metadata file has been discussed above.

Upon receiving the metadata file from sender 10, receiver 20 sends a response message to sender 10 in response thereto.

Sender 10 transmits content files to receiver 20 in step 1034. A header of each of the files being transmitted includes location information that is based on the container structure in which the files are to be recorded.

In this operation, sender 10 transmits a metadata file to receiver 20 after IP assignment between sender 10 and receiver 20 is made.

Figure 11:
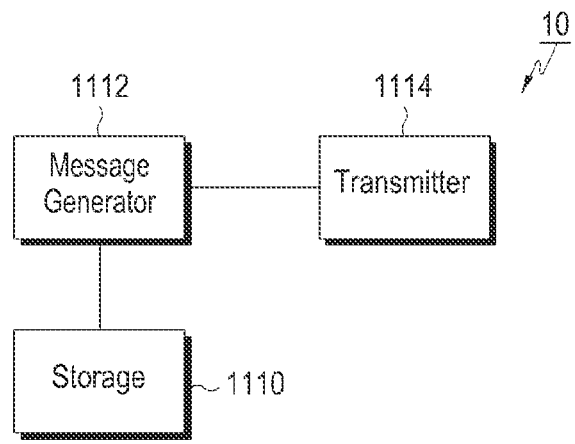
FIG. 11 illustrates the structure of a transmission apparatus for transmitting files in a general purpose device according to an embodiment of the present invention.

FIG. 11 illustrates the structure of a transmission apparatus for transmitting files in a general purpose device according to an embodiment of the present invention.

Referring to FIG. 11, storage 1110 stores files corresponding to specific content available for the transmission apparatus, in one or more directories of a unique container structure. Storage 1110, under the control of, e.g., a controller, outputs information about the container structure corresponding to specific content, and the files which are stored in each directory according to the specific content. Files corresponding to specific content may be stored in storage 1110 as, e.g., described in connection with the example illustrated in FIG. 1.

Message generator 1112 generates a transport message by reading the necessary information from storage 1110. Message generator 1112 may generate a transport message when a request is made for transfer of files corresponding to specific content. Message generator 1112 includes metadata file or files corresponding to specific content according to an embodiment of the present invention. The container structure information to be included as header information of the metadata file or the files corresponding to specific content according to each embodiment has been described above, so the additional description will be omitted here.

The time at which the message generator 1112 generates the necessary message may vary according to the embodiment to be applied. For example, the metadata file including some control information for file transfer may be generated and transmitted before or during the group formation procedure, or may be generated after IP assignment.

On the other hand, message generator 1112 may generate the metadata file at the same time, and the transmission time of the metadata file may be applied differently by the transmitter that will actually transmit the metadata file, according to each embodiment.

Transmitter 1114 sends the message generated by message generator 1112, to a receiving general purpose device. The operation of sending the generated message to the receiving general purpose device by transmitter 1114 may be performed in accordance with the signal processing procedures illustrated in FIGS. 4 to 10. A typical message sent by transmitter 1114 may include a message with a metadata file and a message with content files. In addition, it will be apparent to those of ordinary skill in the art that the typical message may include the message that is sent in the signal processing procedures illustrated in FIGS. 7 to 10.

Figure 12:
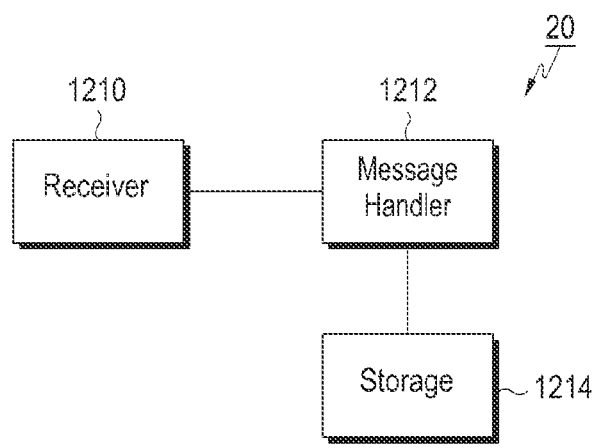
FIG. 12 illustrates the structure of a reception apparatus for receiving files in a general purpose device according to an embodiment of the present invention.

FIG. 12 illustrates the structure of a reception apparatus for receiving files in a general purpose device according to an embodiment of the present invention.

Referring to FIG. 12, receiver 1210 receives a message sent from a sending general purpose device, and forwards the received message to message handler 1212. A typical message received by receiver 1210 may include a message with a metadata file and a message with content files. For example, receiver 1210 may receive a message in accordance with the procedures defined in FIGS. 4 to 10.

Message handler 1212 acquires the metadata file or content files included in the received message forwarded from receiver 1210. Message handler 1212 configures directories in storage 1214 in accordance with the container structure that is determined based on the control information constituting the acquired metadata file and the control information included in headers of the acquired files. Thereafter, message handler 1212 stores the acquired files or the files which are read using the location information included in the control information, in a specified directory among the configured directories.

Figure 1:
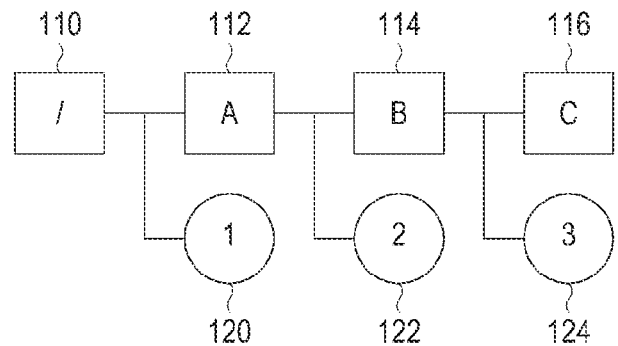
FIG. 1 illustrates an example of a container structure in which files are stored.
Figure 2:
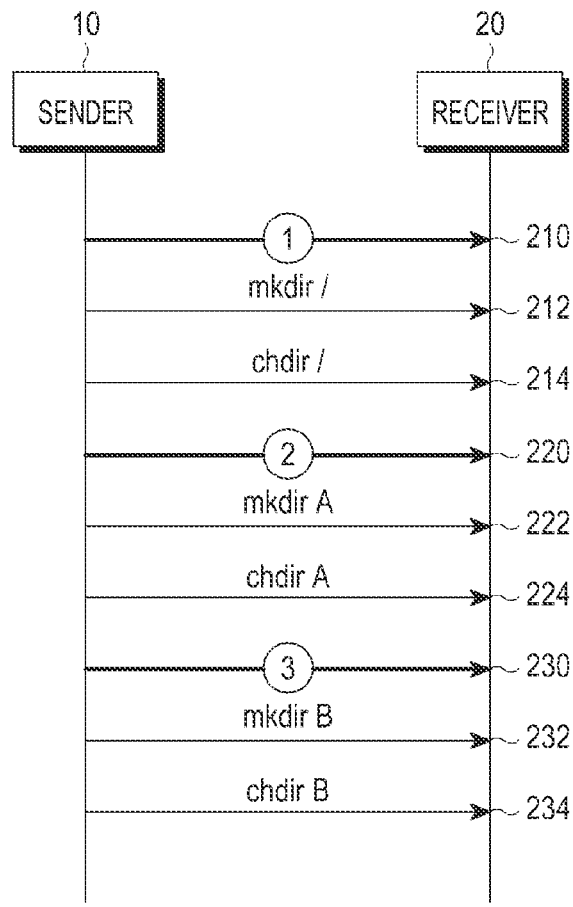
FIG. 2 illustrates an example of conventional signal processing for file transfer between general purpose devices.
Figure 3:
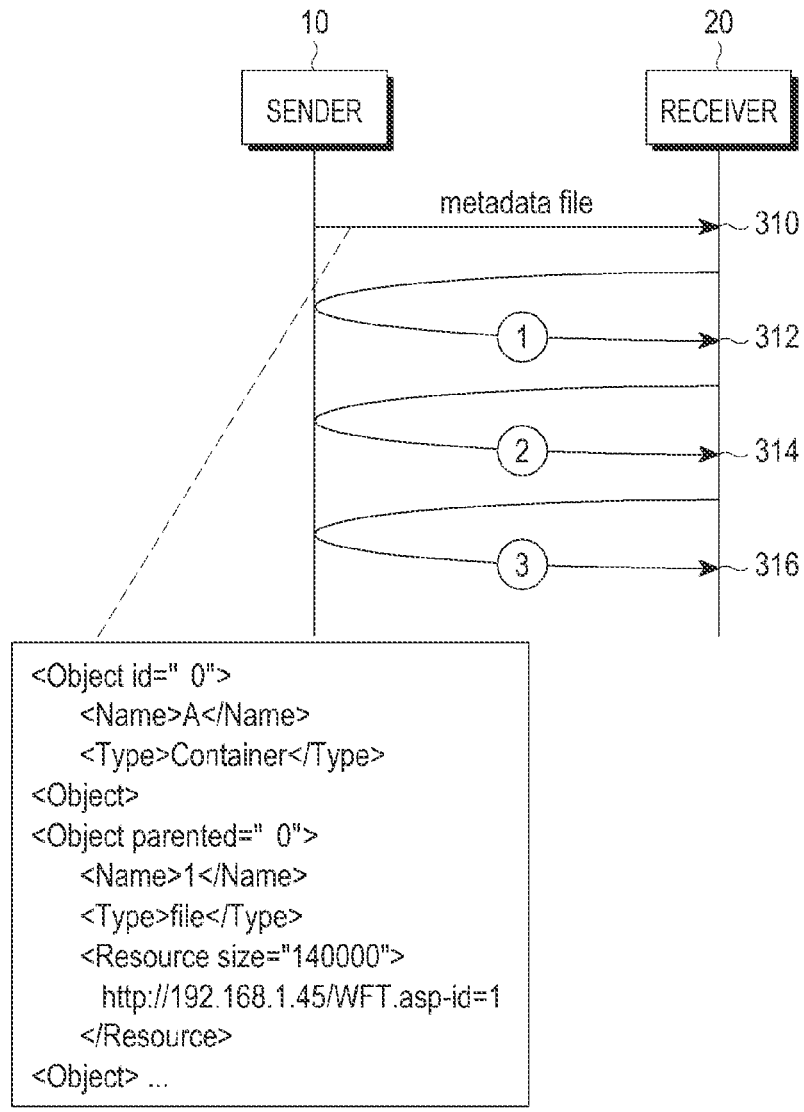
FIG. 3 illustrates another example of conventional signal processing for file transfer between general purpose devices.

For example, using the storage contents of FIG. 1, based on the metadata file and the control information acquired from headers of the received files, message handler 1212 generates a directory 'A' having the root directory as its parent directory, a directory 'B' having the directory 'A' as its parent directory, and a directory 'C' having the directory 'B' as its parent directory.

Thereafter, message handler 1212 receives file #1 and stores it in the root directory, receives file #2 and stores it in directory 'A', and receives file #3 and stores it in directory 'B'.

Through the above-described message handling by message handler 1212, files may be stored in storage 1214 in accordance with the container structure illustrated in FIG. 1.

The transmission apparatus of a general purpose device, which has the structure illustrated in FIG. 11, and the reception apparatus of a general purpose device, which has the structure illustrated in FIG. 12, may transmit and receive files in accordance with any one of the signal processing procedures illustrated in FIGS. 4 to 6. File transfer between general purpose devices is performed in accordance with any one of the signal processing procedures illustrated in FIGS. 7 to 10.

Figure 13:
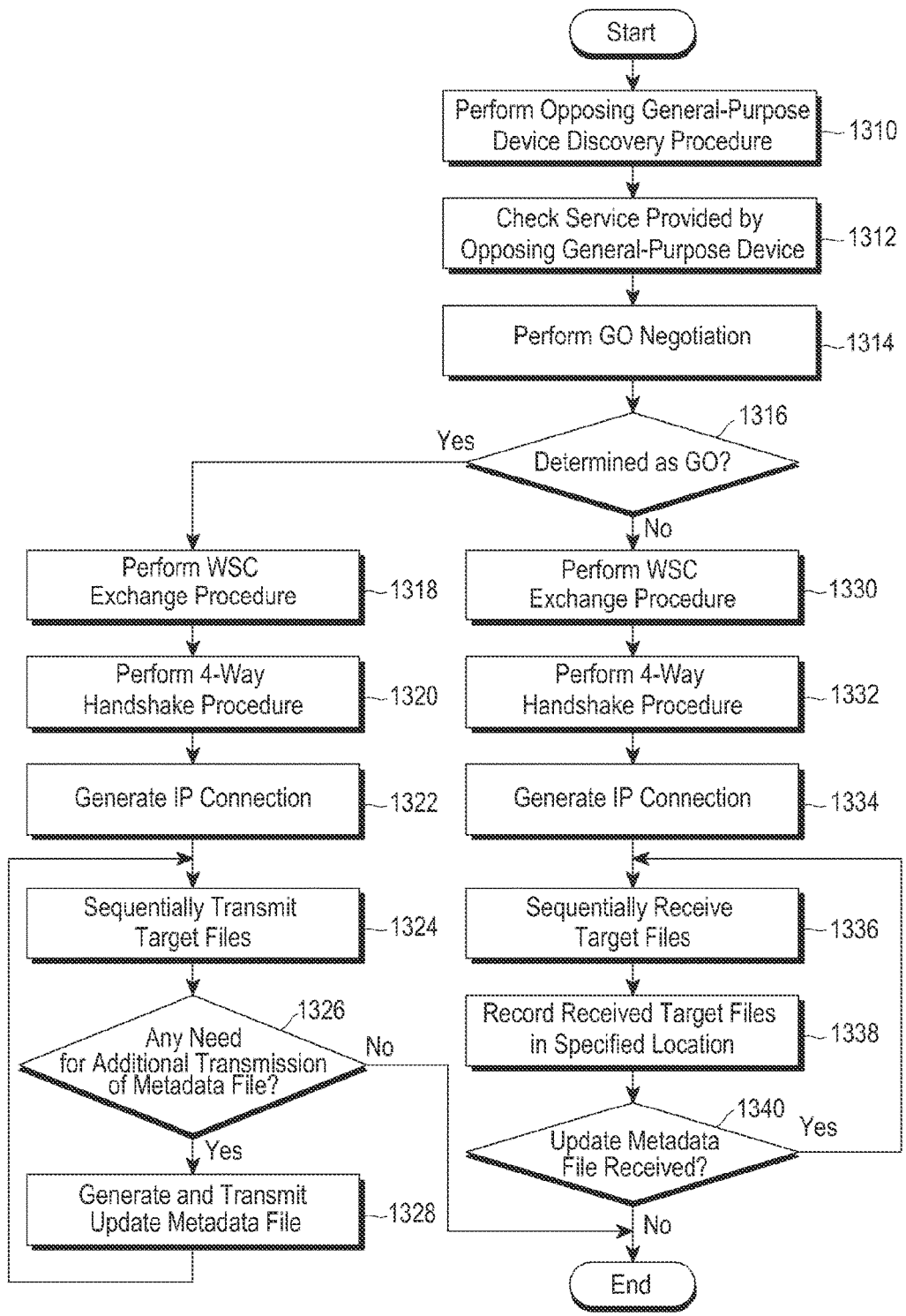
FIG. 13 is a flowchart illustrating a method for controlling the transmission and reception of files in a general purpose device according to an embodiment of the present invention.

FIG. 13 is a flowchart illustrating a method for transmitting and receiving files in a general purpose device according to an embodiment of the present invention. In FIG. 13, the general purpose device determines whether it will perform an operation of transmitting files, or an operation of receiving and recording files, depending on whether the general purpose device is the GO. Steps 1318 to 1328 in FIG. 13 correspond to the transmission operation, and steps 1330 to 1340 correspond to the reception operation.

Referring to FIG. 13, the general purpose device performs a procedure for discovering the other, or opposing, general purpose device to which it will transfer content files in step 1310. For example, in the device discovery procedure for P2P service, the general purpose device may periodically or aperiodically send a probe request message, and find the other, or opposing, general purpose device when it receives a probe response message therefrom in response to the probe request message. The other general purpose device also needs to find the general purpose device that has sent the probe request message, by the same operation.

Once the general purpose devices that will transfer content files have found each other, the first general purpose device checks the service provided by the found other, or opposing, general purpose device in step 1312. For example, if the other general purpose device supports a Wi-Fi file transfer service, the first general purpose device may control the other general purpose device to perform the Wi-Fi file transfer operation later.

If it is determined that the other general purpose device supports the service desired by the first general purpose device, the first general purpose device performs a GO negotiation procedure with the other general purpose device in step 1314. The GO negotiation procedure determines which general purpose device will provide files for specific content.

The first general purpose device determines in step 1316 whether the first general purpose device itself is determined as the GO by the GO negotiation procedure. If the first general purpose device itself is determined as the GO, the first general purpose device will serve as the sending general purpose device that will transfer content files. On the contrary, however, if the other general purpose device is determined as the GO, the first general purpose device will serve as the receiving general purpose device that will receive content files from the other general purpose device.

The first general purpose device proceeds to step 1318 for a transmission operation if it is determined to be the GO, and proceeds to step 1330 for a reception operation if it is not determined to be the GO.

First, the transmission operation will be described in detail. The first general purpose device performs a WSC exchange procedure with the other general purpose device in step 1318. The WSC exchange procedure is a procedure that is performed for security during the later file transfer to the other general purpose device.

The first general purpose device transmits a metadata file to the other general purpose device while performing the WSC exchange procedure. The metadata file to be transmitted includes some of the control information that the other general purpose device requires in order to store the received content files in each directory arranged in accordance with the predetermined container structure. Some control information included in the metadata file may include at least one of the total number of files to be sequentially transmitted, the total file size, a representative file name, a file list-recorded location, and a name and a size of each file.

As another example, the metadata file may be provided to the other general purpose device before the procedure for determining a GO is performed. In this case, however, it should be premised that the first general purpose device itself will transfer content files to the other general purpose device. In other words, when requesting P2P service from the other general purpose device, the first general purpose device may transmit a metadata file, and receive a P2P service response and a P2P service permission message from the other general purpose device in response to the transmitted metadata file.

In order to configure control information to be included in the metadata file, the general purpose device may perform an additional operation of measuring the total number of files to be transmitted, and the transmission capacity.

After the execution of the WSC exchange procedure is completed, the first general purpose device performs the 4-way handshake procedure in step 1320. By the execution of the 4-way handshake procedure, the TCP connection is initialized, which is the path for file transfer between the first general purpose device and the other general purpose device. After the 4-way handshake procedure, the first general purpose device and the other general purpose device are ready to perform file transmission/reception.

In step 1322, the first general purpose device generates an IP connection in the TCP connection which is initialized by the 4-way handshake procedure in step 1320.

Initializing the TCP connection and generating the IP connection may be performed only when the first general purpose device receives an acknowledgement from the other general purpose device in response to the metadata file that the first general purpose device itself transmitted.

The first general purpose device may transmit a metadata file to the other general purpose device when it generates an IP connection. The metadata file being transmitted may include the same control information as that of the metadata file proposed in other examples.

Once the IP connection is generated, the first general purpose device sequentially transmits the files (or target files) which are determined to be transmitted during generation of the metadata file, in step 1324. A header of each of the files to be transmitted includes information about the location in which the files are to be stored. The header may also have information indicating one of the directories arranged in the container structure in which the files are to be stored.

Once the transmission of all the files is completed, the first general purpose device determines in step 1326 whether there is a need for the transmission of an additional metadata file. For example, the first general purpose device may determine that there is a need for an additional metadata file, if there are more files to be transmitted for specific content and/or there is a need for a change in the control information that the first general purpose device transmitted to the other general purpose device in the initially transmitted metadata file.

If there is a need for an additional metadata file, the first general purpose device generates an updated metadata file and transmits the generated metadata file to the other general purpose device in step 1328. If there is no need for an additional metadata file, the first general purpose device completes all the transmission-related operations.

In other embodiments, during the transmission operation, the general purpose device may generate a full list based on separate criteria, bind, in a metadata file, the information (for example, URLs) about the locations where files for specific content to be provided may be acquired, and transmit the metadata file to the other general purpose device. In this case, the general purpose device does not perform an additional procedure for transmitting the content files to the other general purpose device.

However, in the foregoing transmission operation, it is assumed that the general purpose device generates a metadata file for some of the control information for all of the files of content to be provided, and transmits the generated metadata file to the other general purpose device.

Next, the reception operation will be described in detail. The first general purpose device performs the WSC exchange procedure with the other general purpose device in step 1330. The WSC exchange procedure is performed to provide security during the later file reception from the other general purpose device.

In this example, the first general purpose device receives the metadata file from the other general purpose device while performing the WSC exchange procedure. The received metadata file includes some of the control information required to store the received content files in each directory arranged in accordance with the predetermined container structure. Some control information in the metadata file may include at least one of the total number of files to be sequentially transmitted, the total file size, a representative file name, a file list-recorded location, and a name and a size of each file.

In other embodiments, the metadata file may be provided by the other general purpose device before the procedure for determining a GO is performed. In this case, however, it should be premised that the other general purpose device itself will transfer content files to the first general purpose device. In other words, upon receiving a request for P2P service from the other general purpose device, the first general purpose device may receive the metadata file, and transmit a P2P service response and a P2P service permission message to the other general purpose device in response to the request.

After the WSC exchange procedure is completed, the first general purpose device performs a 4-way handshake procedure in step 1332. By executing the 4-way handshake procedure, the general purpose device initializes the TCP connection, which is the path for receiving files from the other general purpose device. In other words, by the 4-way handshake procedure, the first general purpose device may confirm that it is ready to perform file reception, before it actually receives files from the other general purpose device.

In step 1334, the first general purpose device generates an IP connection in the TCP connection which is initialized by the 4-way handshake procedure in step 1332.

Initializing the TCP connection and generating the IP connection may be performed only when the first general purpose device sends an acknowledgement to the other general purpose device in response to the metadata file that the first general purpose device itself received.

The first general purpose device may receive a metadata file from the other general purpose device when it generates the IP connection. The received metadata file may include the same control information as that of the metadata file proposed in other examples.

Once the IP connection is generated, the first general purpose device sequentially receives all the files (or target files) that it has checked based on the control information included in the metadata file, in step 1336. A header of each of the received files includes information about the location in which the files are to be stored. The header may also have information indicating one of the directories arranged in the container structure in which the files are to be stored.

The general purpose device stores the sequentially received target files in one or more directories that are determined based on the information about the location which is identified from the headers of the target files, as arranged in the predetermined container structure. The first general purpose device stores all of the sequentially received files in their specified directories.

In order to determine the predetermined container structure used for recording received files or to acquire desired files, the first general purpose device may use some control information it has received in advance from the other general purpose device using a metadata file.

After storing all the received files in their specified directories, the first general purpose device determines in step 1340 whether an update metadata file has been received from the other general purpose device.

If an update metadata file has been received, the first general purpose device will perform an operation of receiving at least one additional file identified by the update metadata file and storing the received additional file in its specified directory, in steps 1336 and 1338.

If no update metadata file is received in step 1340, the first general purpose device completes all the reception-related operations.

In other embodiments, in the reception operation, the general purpose device generates a full list based on separate criteria, binds, in the metadata file, the information (for example, URLs) about the locations where files for specific content to be provided may be acquired, and transmits the metadata file to the other general purpose device. In this case, the general purpose device may store all the content files in their specified directories arranged in accordance with the desired container structure based on the control information received in the metadata file.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for a first device to transmit files stored in a predetermined directory structure to a second device, the method comprising:
   determining a plurality of files to be transmitted among the stored files;
   generating a metadata file comprising a first uniform resource locator (URL) indicating information including a plurality of second URLs and common information related to the predetermined directory structure, wherein the predetermined directory structure is a tree structure including a plurality of directories, and the plurality of second URLs indicates a plurality of addresses to acquire the plurality of determined files respectively;
   transmitting the generated metadata file to the second device before transmitting the plurality of determined files;
   receiving, from the second device, a request message corresponding to one of the plurality of second URLs;
   generating a response message including a header of a target file and the target file, wherein the target file is one of the plurality of determined files and the header comprises individual information related to a storage location of the target file, in response to the request message; and
   transmitting the response message to the second device, wherein the common information comprises information commonly required to receive and store the plurality of determined files.

2. The method of claim 1, wherein the metadata file comprises at least one of: a total number of the plurality of determined files, a total size of the plurality of determined files, a representative file name, and a name or a size of each of the plurality of determined files.

3. The method of claim 1, wherein the plurality of determined files are configured to be transmitted depending on whether the second device is ready to receive the plurality of determined files.

4. The method of claim 2, wherein transmitting the generated metadata file further comprises:
   transmitting the generated metadata file to the second device while performing a procedure for group formation with the second device.

5. The method of claim 2, wherein transmitting the generated metadata file further comprises:
   transmitting the generated metadata file to the second device after internet protocol (IP) assignment to the second device is performed.

6. The method of claim 1, further comprising:
   generating an updated metadata file if there is a need to update the transmitted metadata file; and
   transmitting the generated updated metadata file to the second device.

7. The method of claim 1, wherein the individual information further comprises information about a length and a type of a content in the target file.

8. A first device for transmitting files, the first device comprising:
   a transceiver;
   a storage configured to store files depending on a predetermined directory structure; and
   a message generator coupled to the transceiver, and the storage, wherein the message generator is configured to:
   determine a plurality of files to be transmitted among the stored files in the storage;
   generate a metadata file comprising a first uniform resource locator (URL) indicating information including a plurality of second resource URLs and common information related to the predetermined directory structure, wherein the predetermined directory structure is a tree structure including a plurality of directories, and the plurality of second resource URLs indicates a plurality of addresses to acquire the plurality of determined files respectively;
   transmit, to a second device, the metadata file generated by the message generator before transmitting the plurality of determined files;
   receive, from the second device, a request message corresponding to one of the plurality of second URLs;
   generate a response message including a header of a target file and the target file, wherein the target file is one of the plurality of determined files and the header comprises individual information related to a storage location of the target file, in response to the request message; and
   transmit, to the second device, the response message generated by the message generator, wherein the common information comprises information commonly required to receive the plurality of determined files.

9. The first device of claim 8, wherein the metadata file comprises at least one of: a total number of the plurality of determined files, a total size of the plurality of determined files, a representative file name, and a name or a size of each of the plurality of determined files.

10. The first device of claim 8, wherein the plurality of determined files is transmitted depending on whether the second device is ready to receive the plurality of determined files.

11. The first device of claim 9, wherein the transmitter is further configured to transmit, to the second device, the metadata file while performing a procedure for group formation with the second device.

12. The first device of claim 9, wherein the transmitter is further configured to transmit, to the second device, the metadata file after internet protocol (IP) assignment to the second device is performed.

13. The first device of claim 8, wherein if there is a need to update the transmitted metadata file, the message generator generates an updated metadata file, and provides the generated updated metadata file to the transmitter so as to transmit the generated updated metadata file to the second device.

14. The first device of claim 8, wherein the individual information further comprises information about a length and a type of a content in the target file.

15. A method for receiving and storing a plurality of files in a second device, the method comprising:
   receiving, from a first device, a metadata file comprising a first uniform resource locator (URL) indicating information including plurality of second URLs and common information related to a directory structure, wherein the directory structure is a tree structure including a plurality of directories, and the plurality of second URLs indicates a plurality of addresses to acquire the plurality of files respectively;

configuring directories according to the directory structure based on the common information;

transmitting, to the first device, a request message corresponding to one of the plurality of second URLs;

receiving, from the first device, a response message including a header of a target file and the target file, based on the plurality of second URLs, wherein the target file is one of the plurality of files and the header includes individual information related to a storage location of the target file;

determining the storage location of the target file in the configured directories based on the individual information; and storing the target file in the storage location, wherein the common information comprises information commonly required to store the plurality of files.

16. The method of claim 15, wherein the metadata file comprises at least one of: a total number of the plurality of files, a total size of the plurality of files, a representative file name, and a name or a size of each of the plurality of files.

17. The method of claim 15, wherein receiving a metadata file further comprises:

receiving, from the first device, the metadata file while performing a procedure for group formation with the first device.

18. The method of claim 15, wherein receiving a metadata file further comprises:

receiving, from the first device, the metadata file after internet protocol (IP) assignment to the first device is performed.

19. The method of claim 15, further comprising:

receiving, from the first device, an updated metadata file after recording the plurality of files.

20. The method of claim 15, wherein the individual information further comprises information about a length and a type of a content of the target file.

21. A second device for receiving and storing a plurality of files, the second device comprising:

a transceiver;

a storage; and a message handler coupled to the transceiver, and the storage;

wherein the message handler is configured to:

receive, from a first device, a metadata file comprising a first uniform resource locator (URL) indicating information including a plurality of second URLs and common information related to a directory structure, wherein the directory structure is a tree structure including a plurality of directories, and the plurality of second URLs, indicates a plurality of addresses to acquire the plurality of files respectively, configure directories according to the directory structure; and transmit, to the first device, a request message corresponding to one of the plurality of second URLs;

receive, from the first device, a response message including a header of a target file and the target file, wherein the target file is one of the plurality of files and the header includes individual information related to a storage location of the target file;

determine the storage location of the target file in the configured directories based on the individual information; and store the target file in the storage location, wherein the common information comprises control information commonly required to store the plurality of files.

22. The second device of claim 21, wherein the metadata file comprises at least one of: a total number of the plurality of files, a total size of the plurality of files, a representative file name, and a name or a size of each of the plurality of files.

23. The second device of claim 21, wherein the receiver is further configured to receive, from the first device, the metadata file while performing a procedure for group formation with the first device.

24. The second device of claim 21, wherein the receiver is further configured to receive, from first device, the metadata file after internet protocol (IP) assignment to the first device is performed.

25. The second device of claim 21, wherein the receiver is further configured to receive, from the first device, an updated metadata file after recording the plurality of files, and receive, from the first device, an additional file;

wherein the message handler is further configured to determine in which directory the received additional file is to be recorded, from among the directories arranged in accordance with the predetermined directory structure, based on a part of updated control information received in the updated metadata file and a remaining part of the updated control information included in a header of the additional file; and wherein the storage is configured to store the received additional file in the directory determined by the message handler among the directories arranged in accordance with the predetermined directory structure.

26. The second device of claim 21, wherein the individual information further comprises information about a length and a type of a content of the target file.

* * * * *